E. M. CHANDLER.
DRY PIPE VALVE.
APPLICATION FILED MAY 7, 1917.
1,299,679.
Patented Apr. 8, 1919.
2 SHEETS—SHEET 1.
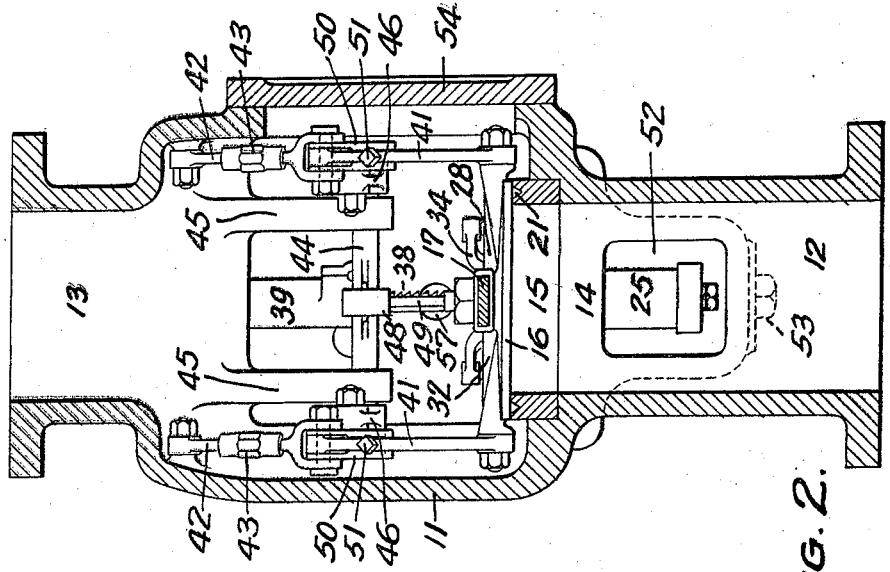
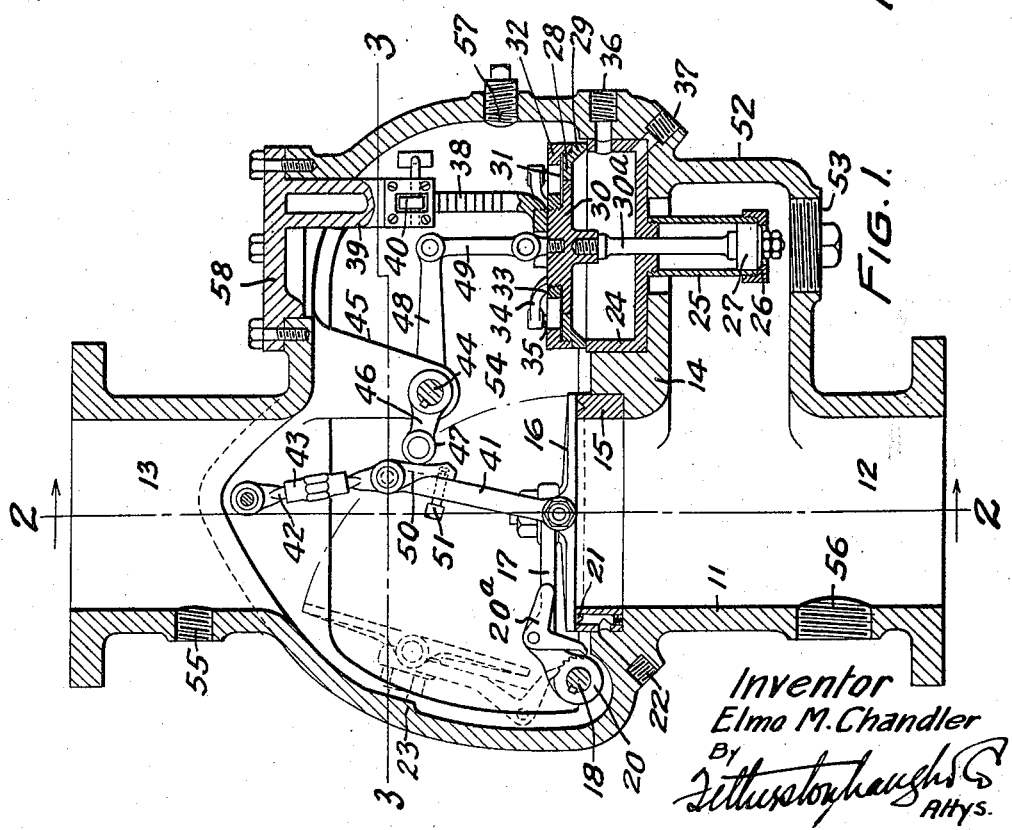
Inventor
Elmo M. Chandler
By
Fitlusstonhaugh&Co
Attys.

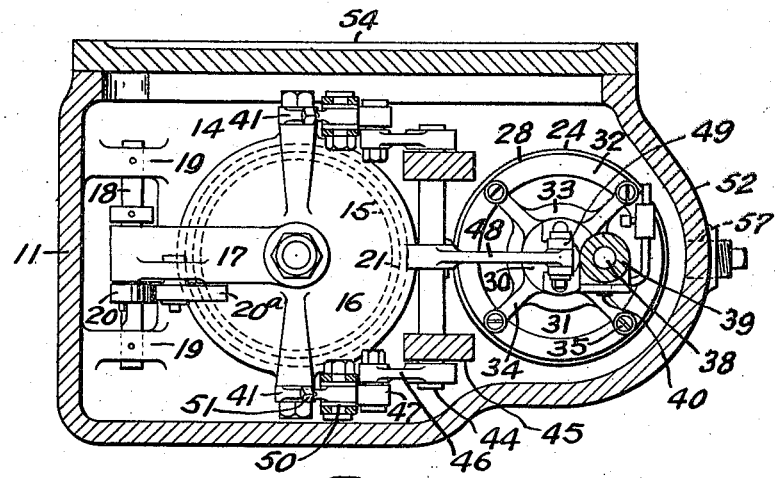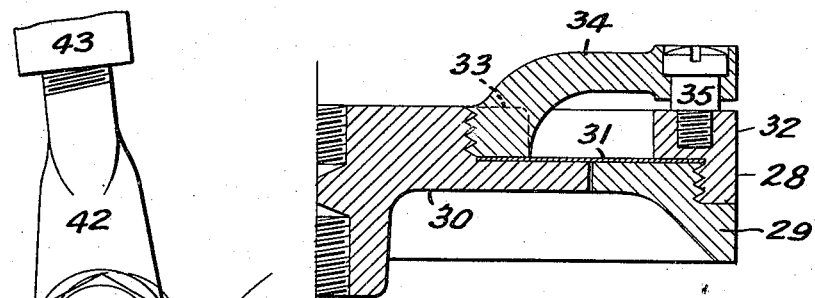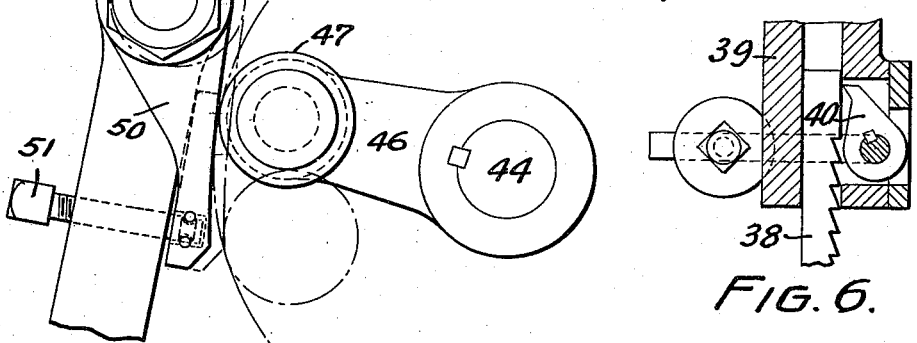

UNITED STATES PATENT OFFICE.

ELMO M. CHANDLER, OF SOUTH NORFOLK, VIRGINIA, ASSIGNOR, BY MESNE ASSIGNMENTS, TO AUTOMATIC SPRINKLER COMPANY, OF CANADA, LIMITED, OF TORONTO, ONTARIO, CANADA.

DRY-PIPE VALVE.

1,299,679.            Specification of Letters Patent.         Patented Apr. 8, 1919.

Application filed May 7, 1917. Serial No. 166,997.

*To all whom it may concern:*

Be it known that I, ELMO M. CHANDLER, a citizen of the United States, and resident of South Norfolk, in the State of Virginia and United States of America, have invented certain new and useful Improvements in Dry-Pipe Valves, of which the following is a full, clear, and exact description.

This invention relates to improvements in dry pipe valves, and the object of the invention is to provide a dry pipe valve, which may be easily and inexpensively manufactured, and which will be lighter, smaller and much simpler than the valves ordinarily in use.

A further object is to provide a valve so arranged that it will not operate the alarm devices on sudden variations of water pressure known as water hammer.

Another object is to provide a valve having an absolutely clear and unobstructed straight line waterway therethrough.

Still another object is to provide a device in which the water valve is held closed by mechanical means rather than by air pressure.

The device consists essentially of a casing having a water inlet and outlet with a clapper valve located between them. A ratchet and pawl arrangement is provided to hold the valve open, when once it has been operated, until manually released, thus permitting water which has entered the system beyond the valve to drain out. To one side of the water-way, a differential valve is provided having a resilient connection between its two parts, so that both parts will seat perfectly. Means are also provided for holding this valve in open position once the opening has passed a certain amount, in order that it must be manually re-set. The water valve is normally held closed by a toggle mechanism which is operated by a lever connected with the differential valve.

In the drawings which illustrate the invention:—

Figure 1 is a view showing the device partly in vertical section and partly in elevation.

Fig. 2 is a vertical section on the line 2—2, Fig. 1.

Fig. 3 is a horizontal section on the line 3—3, Fig. 1.

Fig. 4 is a fragmentary sectional view showing the resilient portion of the differential valve.

Fig. 5 is a fragmentary elevation showing the adjustment between the toggle mechanism and operating lever.

Fig. 6 is an enlarged fragmentary view illustrating the holding device of the differential valve.

Referring more particularly to the drawings, 11 designates a casing of suitable form having an inlet 12 and outlet 13. A diaphragm 14 is provided in the casing having an opening in alinement with the inlet and outlet and surrounded by a valve seat 15 on which the clapper valve 16 rests. This valve is secured to one end of a carrying arm 17, the opposite end of which is revolubly mounted on a spindle 18 rigidly secured to lugs 19 in the casing. A ratchet toothed collar 20 is irrevolubly mounted on the spindle in position to be engaged by a gravity pawl 21 pivotally mounted on the arm 17. The relation between the pawl and ratchet is such that on the slightest opening of the valve 16, the pawl engages the ratchet and holds the valve open. The pawl and ratchet will also hold the valve at any degree of opening. The valve seat 15 is provided in its upper surface with an annular groove 21, which is normally closed by the valve. This groove communicates with an outlet 22 which may be connected to the water flow alarm device of the sprinkler system in which the valve is installed. An abutment 23 is provided in the casing for the valve.

A differential valve is mounted in the diaphragm 14 and comprises a cup-shaped seat 24, to the bottom of which is connected a small cylinder 25 having at its lower end a seat 26 for the piston valve 27. The edge of the cup-shaped seat 24 receives the large valve 28 of the differential. The large valve consists of an annular outer portion 29 and a central circular portion 30, which is connected by a rod 30$^a$ with the piston valve 27, and with the outer annular portion 29 by an annular flexible diaphragm 31. This diaphragm is secured to the annular member 29 by a clamping ring 32 and to the central member 30 by a clamping ring 33, so that relative movement of the members 29 and 30 is resisted by the diaphragm. The clamping ring 33 is provided with a plurality of arms 34 having slidable engagement with studs 35 carried by the ring 32, so that revolution of the ring 29 around the member 30 is prevented. The cup-shaped seat 24 is provided with an outlet 36, which may be connected with the water flow alarm device. This outlet is at the upper part of the cup, so that the cup will act as a retarding chamber, that is to say, small leakages of water into the cup will be carried away through the drain 37 and will not reach to the level of the outlet 36. Thus, momentary operations of the valve by irregular pressure or water hammer admitting only a small quantity of water will not operate the water flow alarm device. The valve 28 is provided with a ratchet toothed rod 38 slidable in a guide 39 mounted within the casing. This guide is provided at its lower end with a gravity pawl 40 adapted to engage the teeth of the rod 38 and hold the differential valve open. The teeth of the rod 38 do not extend clear to the end thereof, so that the differential valve is permitted a certain limited movement before the pawl engages the teeth of the rod. In this way, the slight momentary movements of the differential valve due to water hammer do not cause the valve to be locked open, but if any considerable movement occurs, the differential valve is locked open and must be manually closed.

Toggle mechanism is provided for holding the water valve 16 closed, this mechanism is in duplicate, each half thereof being connected to diametrically opposite points of the valve and lying close against the side of the casing entirely out of the waterway. Each toggle consists of a lever 41, pivotally connected at its lower end to the valve, and at its upper end to a lever 42, which for purposes of adjustment is made in two parts connected by a turn buckle 43. The lever 42 is pivoted at its upper end to the casing. A shaft 44 is revolubly mounted in lugs 45 within the casing clear of the waterway, and the path of the valve 16. This shaft carries at each end the short arm 46 of a lever, which short arm has at its free extremity a roller 47 for operative engagement with the toggle mechanism. The long arm 48 of the lever extends from the center of the shaft, and its free end is located vertically above the central member 30 of the differential valve, to which it is connected by a pivotal link 49. In order to permit of adjustment between the operating lever and the toggle mechanism, a cam 50 is pivoted at one end at the joint of the toggle, and is held at its other end by an adjusting screw 51 in the lever 41. This cam forms the abutment on which the roller 47 travels to operate the toggle, and its tread surface is so curved that a portion thereof substantially corresponds with the path of the roller 47 adjacent the free end and projects into the path adjacent the opposite or pivoted end, so that the travel of the roller over the cam exerts a wedging action tending to straighten out the toggle. When the toggle has been straightened out, said corresponding portion of the face of the cam 50 registers with the path of the roller 47, that slight movements of the levers 46 and 48 caused by sudden variations in water pressure will not have the effect of loosening the toggles. This will be clearly understood by comparison of Figs. 1 and 5.

The differential valve, as will be clearly seen, is mounted in a lateral extension 52 of the casing, which extension is provided in the bottom with a large screw plug 53, on removal of which access may be had to the seat 26 and piston 27. Above the diaphragm 14, access may be had to the interior of the valve by removal of the large hand-hole plate 54, which forms practically an entire side of the casing 11 and its extension 52. An opening 55 is provided in the casing 11 a suitable distance above the valves, through which air may be pumped into the system after the valve has been set and the hand-hole plate closed. A further opening 56 is provided below the diaphragm, and having its lowest point below the extension 52 for the connection of a drainage pipe. A short distance above the level of the valves, an opening 57 is provided in the casing having a suitable closure, on removal of which priming water may be introduced to cover the valves. The extension 52 of the casing above the differential valve may be provided with a hand-hole plate 58.

In operation the valve is normally closed, that is to say, both the water valve and the differential valve are closed and separate the water on the lower side of the diaphragm 14 from the air on the upper side. It will thus be seen that the large lower surface of the water valve 16 and the small surface of the piston valve 27 are exposed to water pressure and the slightly larger upper surface of the water valve and the large part 28 of the differential valve are exposed to air pressure. This enables a comparatively low air pressure to be maintained in the system and to keep the valve closed against a comparatively high water pressure. The low air pressure on the large part 28 of the differential valve more than counterbalances the high water pressure on the small part of the piston valve 27, so that the differential valve remains on its seat and holds the water valve 16 mechanically closed through the medium of the toggle and lever mechanism. It will be seen that the water valve is held closed mechanically and irrespective of the small counterbalance of water pressure on its lower side by the air pressure on its upper side.

When air is released from above the valve, as for instance by the operation of the sprinkler head, the differential valve is released and the water pressure on its piston part 27 forces the valve open, thus releasing the toggle mechanism and enabling the water pressure to throw the valve 16 open, so that the water rushes through to the outlet 13 of the valve. The rush of water throws the valve to full open position, as shown in dotted lines, Fig. 1, where it is held by the ratchet and pawl mechanism. To re-set the valve, the ratchet and pawl mechanism of both the water and differential valves must be manually released, the valves closed and the toggle mechanism replaced in the position shown in Fig. 1. The necessary air pressure is then introduced and subsequently the water pressure.

In the event of sudden variations of water pressure, such as are caused by water hammer, the differential valve is slightly moved, but when the water pressure returns to normal, the valve is closed by the air pressure. The movement permitted before the differential valve locks open is not enough to loosen the toggle mechanism sufficiently to permit a leakage of water under the valve 16. If the excess water pressure is sufficient to open the differential valve to a locking position, the water valve is loosened sufficiently for a small leakage of water into the channel 21, and thence through the outlet 22 to the water flow alarm device. If the flow at the valve 16 is not sufficient to flood the valve and fill the retarding chamber faster than water can escape through the drain 37, the sealing water above the diaphragm 14 will fill the retarding chamber and escape through the pipe 36 to the water flow alarm device. It will thus be seen that the alarm device may be operated from either or both of the two sources, so that defects in the valve will make themselves apparent.

The resilient connection in the differential valve permits both the large and small ends thereof to seat tightly. If there should be faulty adjustment of the valves, so that one seats before the other, the parts 29 and 30 may be moved relatively by flexure of the annular diaphragm 31, so that both parts of the valve will seat.

If it should be necessary to grind either the valve 16 or its seat 15, the toggle mechanism may be adjusted to compensate for the loss of metal, and the cam 50 also adjusted to maintain the proper relation between the toggle and the operating lever, so that the toggle will be tightened to just the proper degree when the differential valve is closed. The adjustment of the cam also permits the differential valve and its seat to be ground without danger of reducing the efficiency of the device.

Having thus described my invention, what I claim is:—

1. In a dry pipe valve, a water valve, toggle mechanism for holding said valve closed, a differential valve, and a lever actuated by the differential valve operatively engaging the toggle mechanism.

2. In a device of the class described, a water valve, a differential valve, toggle mechanism holding the water valve closed, a lever exerting wedging action on said toggle mechanism to hold the water valve closed, and operative connection between the differential valve and lever.

3. In a device of the class described, a water valve, means for locking said valve at any degree of opening, a differential valve, and means for locking said valve open permitting partial opening of the valve without locking.

4. In a device of the class described, a water valve, a differential valve, an outlet from beneath each of said valves for connection with a water flow alarm device, and a retarding chamber at the mouth of the water outlet under the differential valve.

5. In a device of the class described, a water valve, a differential valve, differential valve controlled means holding the water valve normally closed, independent means for locking each of said valves in open position, the locking means of said differential valve being ineffective for valve movements insufficient to cause release of the water valve.

6. In a device of the class described, a water valve, a differential controlling valve therefor, a guide, a ratchet toothed rod carried by the differential valve, and slidable in said guide, and a gravity pawl mounted on said guide engageable with the teeth of said rod to hold the valve in open position.

7. A device according to the preceding claim in which the differential valve has limited movement without affecting the water valve, and the rod teeth remain out of engagement with the pawl until such movement is exceeded.

8. In a device of the class described, a valve, a valve seat, a valve casing having a water way, toggle mechanisms located at diametrically opposite points of the valve clear of the water way and each connected at one end to the valve and at the opposite end to the casing, and means for adjusting the length of one arm of each toggle.

9. In a device of the class described, a casing, a valve therein, a toggle mechanism, a cam carried by the toggle mechanism, a toggle operating lever engageable with the cam, said cam having a portion of its surface so formed that limited oscillation of the lever has no operative effect on the toggle.

10. A device according to the preceding claim in which the cam is pivotally mounted in the toggle hinge, and having cam adjusting means.

11. In a device of the class described, a water valve, a differential controlling valve therefor having its large end formed in two parts flexibly connected and operative connection between the valves.

12. In a device of the class described, a water valve, a differential controlling valve therefor including large and small closure members, the large member being divided into a central and a surrounding annular portion, rigid connection between the central portion of the large valve and the small valve, flexible connection between the central and annular portions of the large valve and operative connection between said central portion and the water valve.

13. In a device of the class described, a water valve, a differential controlling valve therefor having separate central and surrounding annular portions, an annular flexible member rigidly attached at its inner edge to the central portion and at its outer edge to the outer annular portion and permitting a limited relative movement of the parts in their axial direction and operative connection between said central portion and the water valve.

14. In a device of the class described, a water valve, a differential controlling valve therefor including a central portion and a surrounding annular portion, a flexible annular member connecting the central and annular portions, and permitting limited movement in their axial direction, means holding the parts against relative revolution and limiting movement in the axial direction and operative connection between one of the parts and the water valve.

15. In a device of the class described, a water valve closure means therefor, a differential valve including small and large heads, the large head having a peripheral seating portion and a central portion rigidly connected to the small head and flexibly connected to the peripheral portion, and operative connection between the central portion and the closure means permitting limited movement of the small head and central portion without operative effect on said closure means, and without unseating the peripheral portion.

In witness whereof, I have hereunto set my hand.

ELMO M. CHANDLER.

Copies of this patent may be obtained for five cents each, by addressing the "Commissioner of Patents, Washington, D. C."